(12) United States Patent
Chiem

(10) Patent No.: US 9,536,679 B2
(45) Date of Patent: Jan. 3, 2017

(54) TRENCHED SUPER/ULTRA CAPACITORS AND METHODS OF MAKING THEREOF

(71) Applicant: Johnny Duc Van Chiem, Fremont, CA (US)

(72) Inventor: Johnny Duc Van Chiem, Fremont, CA (US)

( * ) Notice: Subject to any disclaimer, the term of this patent is extended or adjusted under 35 U.S.C. 154(b) by 0 days.

(21) Appl. No.: 14/988,626

(22) Filed: Jan. 5, 2016

(65) Prior Publication Data

US 2016/0196932 A1 Jul. 7, 2016

Related U.S. Application Data

(60) Provisional application No. 62/100,425, filed on Jan. 6, 2015.

(51) Int. Cl.
| | | |
|---|---|---|
| *H01G 9/00* | (2006.01) | |
| *H01G 11/86* | (2013.01) | |
| *H01G 11/30* | (2013.01) | |
| *H01G 11/36* | (2013.01) | |

(52) U.S. Cl.
CPC ............. *H01G 11/86* (2013.01); *H01G 11/30* (2013.01); *H01G 11/36* (2013.01)

(58) Field of Classification Search
CPC ...... H01G 9/00; H01G 9/0036; H01G 9/0032; H01G 11/86
See application file for complete search history.

(56) References Cited

U.S. PATENT DOCUMENTS

| | | |
|---|---|---|
| 5,150,283 A | 9/1992 | Yoshida et al. |
| 8,021,524 B2 * | 9/2011 | Suh .................. B82Y 30/00 204/242 |
| 8,299,515 B2 | 10/2012 | Ervin et al. |
| 8,373,971 B2 | 2/2013 | Young |
| 8,492,818 B2 | 7/2013 | Wong et al. |
| 8,557,673 B1 | 10/2013 | Huang et al. |
| 8,569,816 B2 | 10/2013 | Shroff et al. |

OTHER PUBLICATIONS

Arthur et al., "Three-Dimensional Electrodes and Battery Architectures", MRS Bulletin, vol. 36, Jul. 2011, pp. 523-531.

* cited by examiner

*Primary Examiner* — Seahvosh Nikmanesh
(74) *Attorney, Agent, or Firm* — Morrison & Foerster LLP

(57) ABSTRACT

A method of manufacturing trenched electrochemical double layer capacitors is provided. One aspect of the method employs state-of-the art processes used in semiconductor wafer manufacturing such as photolithography etching for creating trenches in the electrodes of the double layer capacitor. Another aspect of the method employs a die-saw process, which is scalable and low-cost. The trenched super/ultra capacitors made by the disclosed methods have the combined advantage of higher energy storage capacity than conventional planar super/ultra capacitors due to the increased surface area and higher power density than commonly used Li-ion batteries due to the faster charging time and higher instantaneous energy burst power. The manufacturing processes also have the advantage of better manufacturability, scalability and reduced manufacturing cost.

17 Claims, 19 Drawing Sheets

FIG 2.
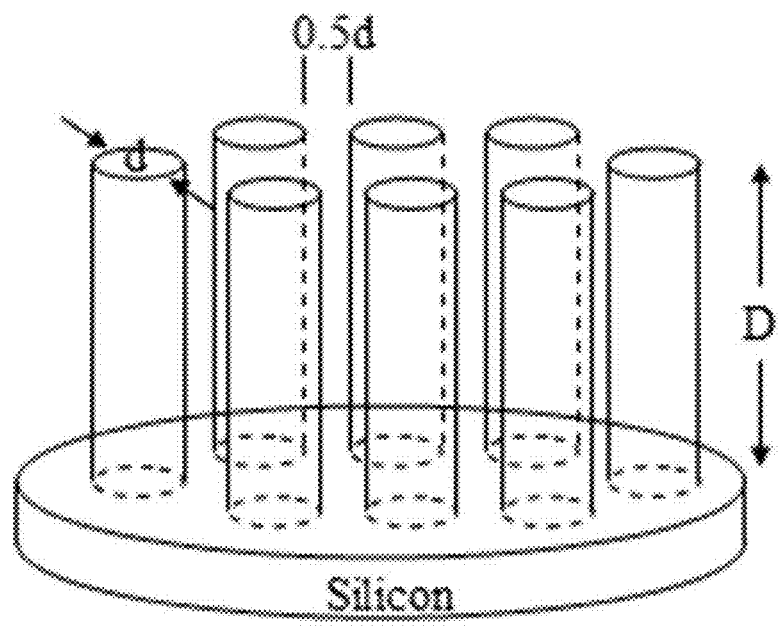
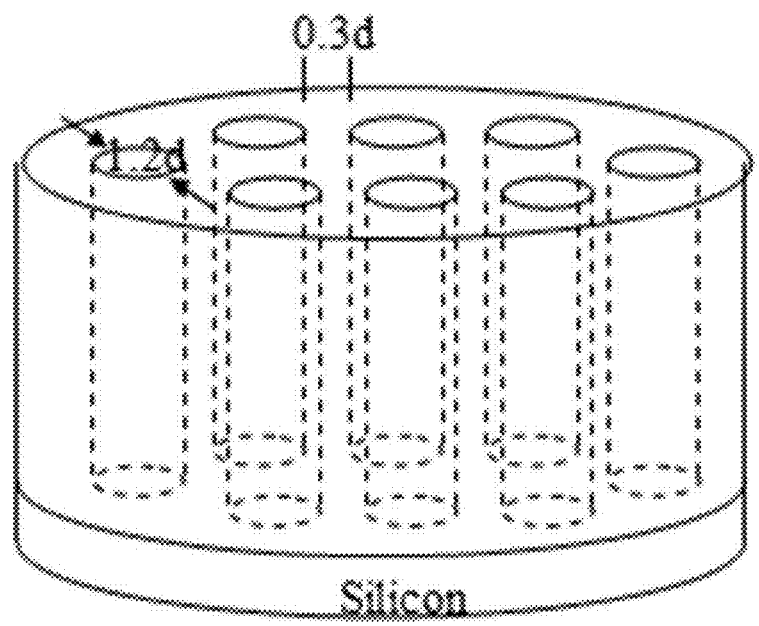

FIG 3.
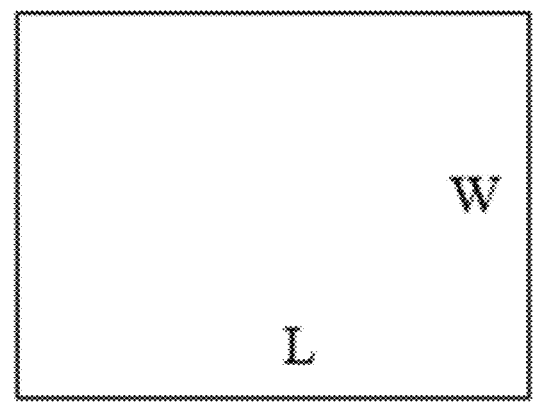
Planar
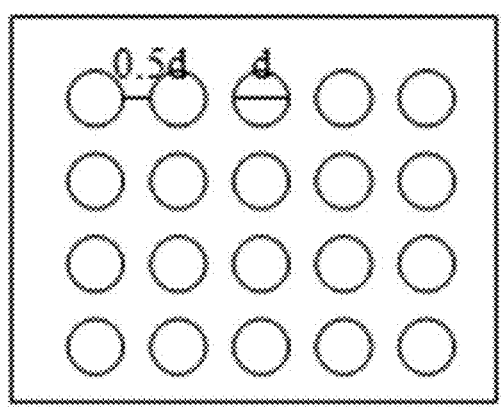
Structure 1
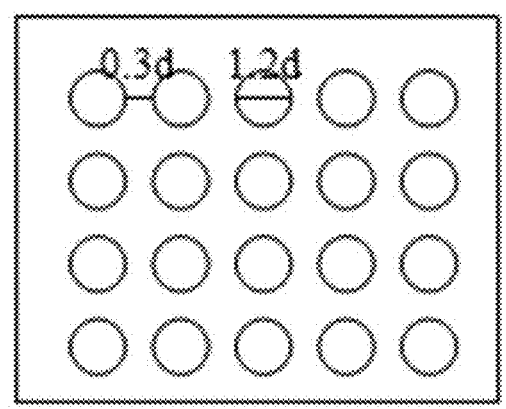
Structure 2

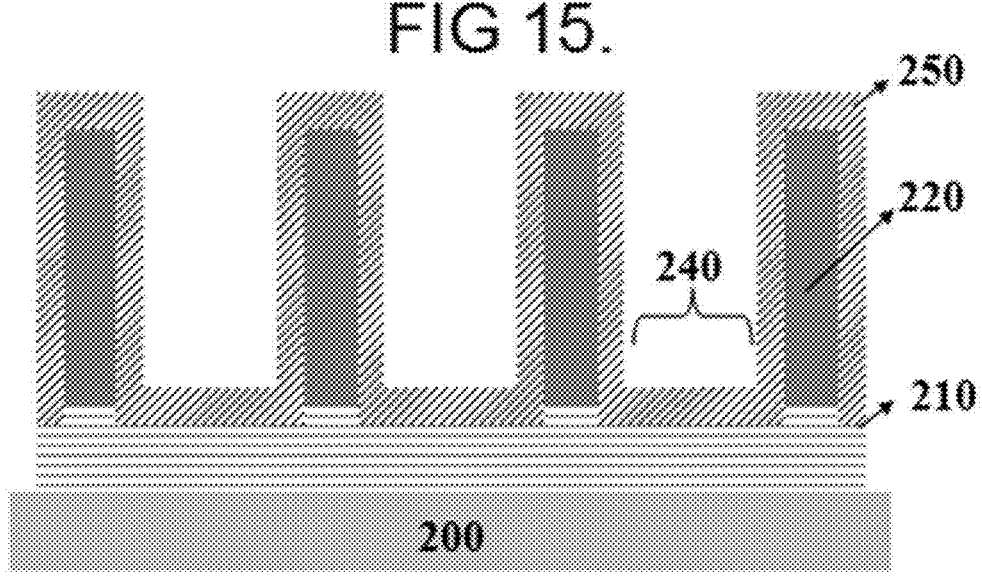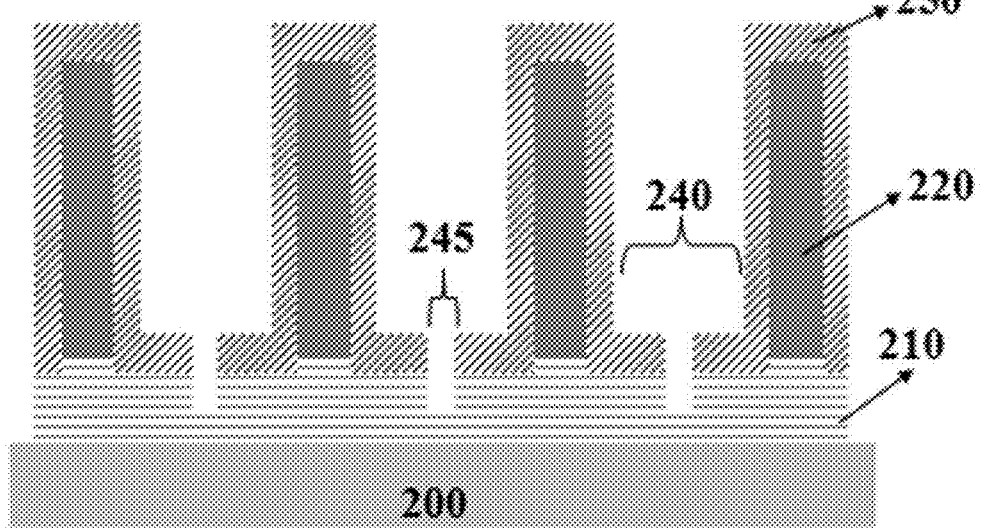

TRENCHED SUPER/ULTRA CAPACITORS AND METHODS OF MAKING THEREOF

CROSS REFERENCE TO RELATED APPLICATIONS

This application claims priority to U.S. Provisional Patent Application No. 62/100,425, filed Jan. 6, 2015, the disclosure of which is incorporated herein by reference in its entirety.

FIELD OF THE INVENTION

The instant disclosure relates to methods of manufacturing capacitor structures, particularly manufacturing methods for double layer capacitors or super/ultra-capacitors with trenched electrodes and increased surface area. The trenched super/ultra-capacitors disclosed herein are useful, for example, in energy storage devices in power applications.

BACKGROUND OF THE INVENTION

Electrochemical double layer capacitor or super/ultra-capacitors have been known for many years but have been used sparsely in power applications. A standard electrochemical double layer capacitor or super/ultra-capacitor traditionally consists of two high surface area electrodes that are polarized with the use of an electrolytic acid. The capacitance (C) of plate capacitors can be calculated with equation $C=(\epsilon*A)/d$, where $\epsilon$ is the permittivity of the capacitor material, A is the surface area of the electrode plate, and d is the distance between plates. The charges in a super/ultra-capacitor are held between two ionic charges (distance d) called the Helmholtz layer. Due to the very short distance d, typically less than 0.4 μm, a very high capacitance compared to conventional capacitors can be achieved using the Helmholtz layer.

The characteristics of super/ultra-capacitors include very fast charge time and high instantaneous power bursts. Since a super/ultra-capacitor does not rely on an electrochemical reaction, it also does not suffer from a "memory effect" that is often seen in batteries. Therefore, super/ultra-capacitors can bridge the gap between conventional capacitor (high power/low energy) and electrochemical devices such as rechargeable batteries (low power/high energy). In addition, super/ultra-capacitors are often seen as a "green" alternative compared to traditional batteries. The lifetime of super/ultra-capacitors can run maintenance free for 10-15 years; thus replacing traditional batteries with super/ultra-capacitors can reduce hazardous chemical wastes.

However, mass adoption has been slow for electrochemical double layer capacitors or super/ultra-capacitors due to their low energy storage capacity compared to rechargeable batteries and relatively high cost for manufacturing. Applications of super/ultra-capacitors are limited mostly to industrial applications, such as regenerative braking for large trains or engine start for large commercial diesel trucks. There remains a need for electrochemical double layer capacitors or super/ultra-capacitors with higher energy storage capacity and low cost manufacturing processes in order to meet the increasing demand for fast charging and high capacity energy storage devices in today's emerging electronic applications like mobile phones and electric vehicles.

BRIEF SUMMARY OF THE INVENTION

The invention provides low cost processes and methods for making electrochemical double layer super/ultra-capacitors with trenched electrodes which provide high surface area and thus high energy storage capacity.

In one aspect, provided is a method/process for making an electrochemical double layer capacitor comprising: producing a first trenched electrode by forming an electrode layer on a first substrate having a first trench opening therein; producing a second trenched electrode by forming an electrode layer on a second substrate having a second trench opening therein, wherein the second trench opening in the second substrate having a 3-dimensional shape complimentary to the first trench opening in the first substrate and a remaining protruding structure substantially the same in shape as the first trench opening in the first substrate; combining the first trenched electrode with the second trenched electrode such that the protruding structure in the second trenched electrode substantially fit into the trench opening in the first trenched electrode and leaving a gap between the first electrode and the second electrode; and filling the gap between the first and second trenched electrode with an electrolyte. In some embodiments, the process further comprises forming the first trench opening in the first substrate and forming the second trench opening in the second substrate. In some embodiments, the process comprises forming the trench openings by photolithography etching. In some embodiments, the first and/or second substrate is a highly doped silicon substrate, and forming the electrode layer on the first and/or second substrate comprises wet-etching a layer of the highly doped silicon substrate to form a porous silicon electrode layer. In some embodiments, the process further comprises forming (e.g., sputtering) a metal barrier layer on the first and/or second substrate prior to forming the electrode layer on the first and/or the second substrate, and forming the electrode layer on the first and/or second substrate comprises sputtering an electrode material on the metal barrier layer. In some embodiments, the metal barrier layer comprises Ti or TiN. In some embodiments, the electrode material is polypyrrole (PPY), activated carbon, graphene or carbon nanotubes. In some embodiments, the electrolyte is electrolytic acid, KOH/acetonitrile, or a gel electrolyte. In some embodiments, the substrates are highly doped silicon substrate. In some embodiments, the trench opening in the first trenched electrode and the protruding structure in the second trenched electrode are cylindrical in shape.

In another aspect, provided is a die-saw process for making an electrochemical double layer capacitor comprising: providing a conductive plate, wherein the conductive plate is attached to an insulating substrate board via a non-conductive adhesive layer and is fitted with contact pads on both edges; forming a plurality of trenches by sawing the conductive plate at a predetermined pitch size to a depth where the adhesive layer is exposed, wherein the trenches having a floor composed of the non-conductive adhesive layer and side walls composed of the conductive plate; coating the floor and the side walls of the trenches with a layer of electrode material to form electrodes; sawing through the layer of electrode material on the floor of the trenches to form narrow trenches; inserting separators into the narrow trenches, wherein the separators are attached to a frame comprising side walls; sealing the sidewalls and the trench floor by flowing a framing adhesive around the separators; and injecting electrolyte to fill gaps between the electrodes and the separators. In some embodiments, the process further comprises placing the non-conductive adhesive layer on the insulating substrate board and attaching the conductive plate onto the non-conductive adhesive layer. In some embodiments, the process further comprises: injecting an adhesive to seal the topside; exposing the contact pads; attaching polar metal bars to the contact pads; and assembling into casing. In some embodiments, the insulating substrate board is marked with alignment marks. In some embodiments, the non-conductive adhesive is a wax or a glue. In some embodiments, the conductive plate comprises highly doped silicon. In some embodiments, the layer of electrode material comprises metal nano structure layer and a conductive metal oxide layer. In some embodiments, the electrode material comprises activated carbon, graphene, carbon nanotubes, or PPY. In some embodiments, the electrolyte comprising sulfuric acid or KOH/acetonitrile.

Also provided is an electrochemical double layer capacitor produced by any of the processes described herein. Further provided is an electrochemical double layer capacitor assembly comprising one or more of the double layer capacitors produced by any of the processes described herein.

BRIEF DESCRIPTION OF THE DRAWINGS

FIGS. 2-4 are schematic illustrations of another exemplary design of the trenched electrodes in a double layer super/ultra-capacitor.

FIGS. 13-22 are schematic vertical cross-sectional views of exemplary embodiments in a die-saw process of making a double layer super/ultra-capacitor.

DETAILED DESCRIPTION OF THE INVENTION

The amount of charge that can be held in an electrochemical double layer capacitor or a super/ultra-capacitor is based on the total surface area of the electrodes. The electrodes are key parts for super capacitors. An increase in the surface area of the electrodes allows for more charge storage. Porous materials, typically carbon based materials have been used to achieve such goal. On top of the electrode is a current collector material to conduct the current. While research has been conducted to increase the surface area of the electrode by introducing more porous material such as graphene or nanotubes, the electrode surface area for a given material may be increased further by changing the topology of the current collector material. The present invention focuses on increasing the surface area of the electrodes to increase both power density and energy storage capacity of the super/ultra-capacitors.

Thus provided are compositions for electrochemical double layer super/ultra-capacitors comprising electrodes having a three-dimensional trench topology rather than a standard planar topology. The trench structure creates extra planes at the trench side walls which increase the surface area of the current collecting material. When the electrode material is formed on top of this current collecting layer, a significant increase in surface area is achieved by tuning the trench parameters. The super/ultra-capacitor having trenches in the current collector material possesses a higher energy storage capacity combined with a higher power density compared to standard conventional planar super/ultra-capacitors.

Figure 1:
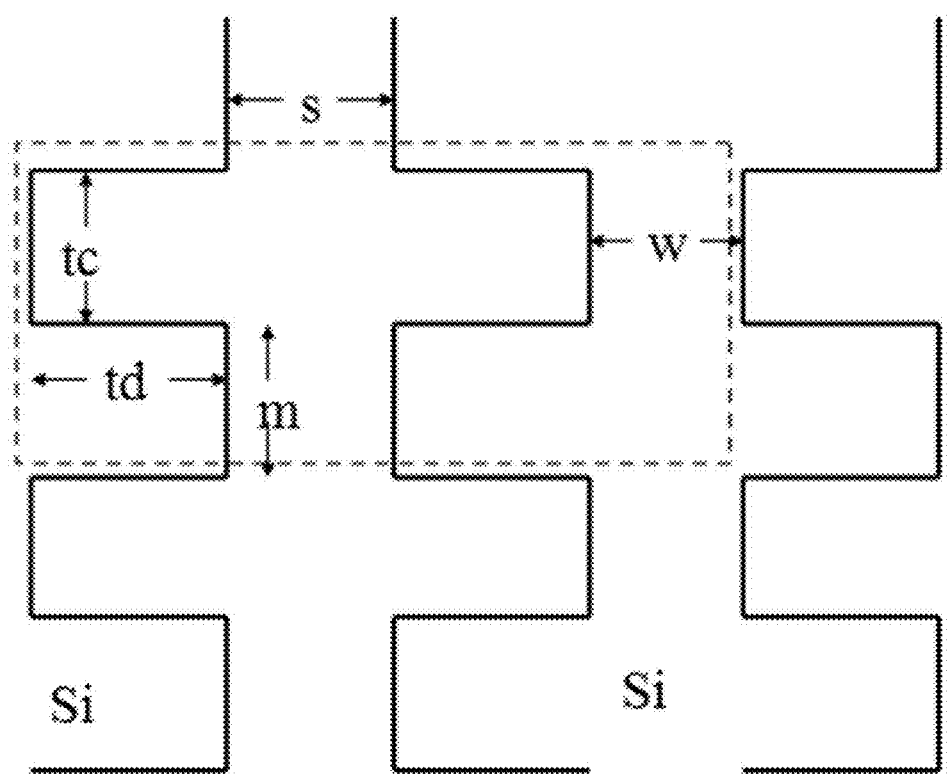
FIG. 1 is a schematic top down view of an exemplary design of a trenched electrode.

Referring to the drawings, FIG. 1 shows an exemplary design of an electrode having a three-dimensional trench topology. The dotted area is defined as the planar control area, whereas the total surface area is equal to $(2*td+s+w)*(tc+m)$ and the proposed trench design area is defined as the control area+$(2*tc+2*m+4td)*D$, whereas, D is defined as the depth of the trench. The maximum difference between the planar and trench total surface area is achieved when D is set at maximum while s, w, tc and m are set as minimum. In one embodiment, the distance D is in the range of about 10 to about 500 µm.

Figure 4:
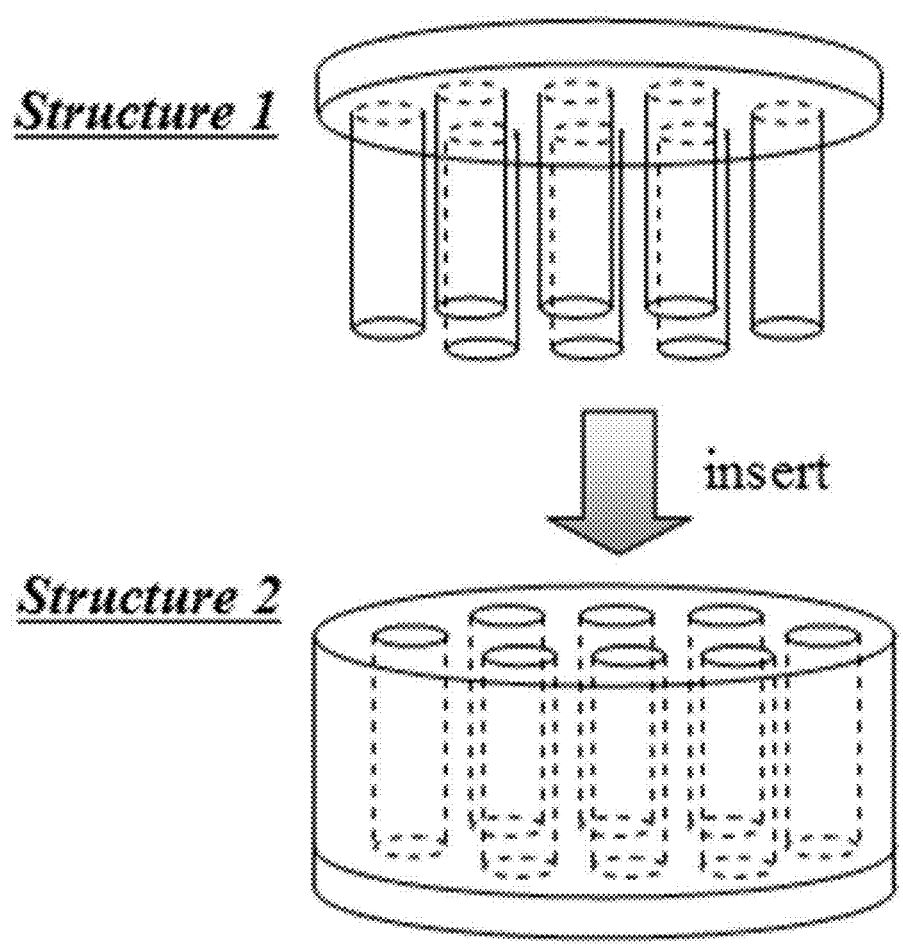

Furthermore, a higher degree of difference in surface area can be achieved using a cylindrical trench design. FIGS. 2-4 illustrate an exemplary design of an electrode having cylindrical trench openings. FIG. 3 shows horizontal cross-sectional views of a planar control area (without any trenches) and the circular openings in Structure 1 and Structure 2. As defined as the planar control area, the total surface area is equal to $L*W$. With a cylindrical trench design, the total surface area for Structure 1 is equal to the control area+$(L/1.5d)*(W/1.5d)*\pi*d*D$, whereas D is the depth of the trench. The ratio between the total surface area in a cylindrical trench design and the total surface area of a standard planar design is $1+\pi D/(2.25d)$, or about $1+1.4*(D/d)$, whereas, D/d is the aspect ratio of the cylindrical trench design. For example, the total surface area of an electrode having a cylindrical trench design with an aspect ratio (D/d) of about 71 would be about 100 times of the surface area of a standard planar design. Using current state of the art deep trench etching methods, the D/d aspect ratio can be processed up to about 200, which would lead to about 280 times as much surface area relative to a standard planar design.

Also provided are methods/processes for making the trenched double layer super/ultra-capacitors. The methods/processes take advantage of the better manufacturability of the trenched super/ultra-capacitors and employ techniques developed for semiconductor manufacturing such as a wafer manufacturing process and a die-saw process. The processes provides for increased scalability and reliability of the trenched electrodes.

The term "a" or "an" as used herein, unless clearly indicated otherwise, refers to one or more.

Manufacturing Process Using Photolithography Etching

In one aspect, provided is a process for making an electrochemical double layer capacitor comprising filling a gap between a first trenched electrode and a second trenched electrode in an electrochemical double layer capacitor with an electrolyte, wherein the gap is formed by combining the first trenched electrode and the second trenched electrode to form the electrochemical double layer capacitor, wherein the first trenched electrode comprising a first trench opening, the second trenched electrode comprising a second trench opening having a 3-dimensional shape complimentary to the first trench opening in the first trenched electrode and a remaining protruding structure substantially the same in shape as the first trench opening in the first trenched electrode, wherein the protruding structure in the second trenched electrode substantially fit into the trench opening in the first trenched electrode and leaving the gap between the first electrode and the second electrode. In one aspect, provided is a process of making an electrochemical double layer capacitor comprising: (1) combining a first trenched electrode and a second trenched electrode to form an electrochemical double layer capacitor, wherein the first trenched electrode comprising a first trench opening, the second trenched electrode comprising a second trench opening having a 3-dimensional shape complimentary to the first trench opening in the first trenched electrode and a remaining protruding structure substantially the same in shape as the first trench opening in the first trenched electrode, wherein the protruding structure in the second trenched electrode substantially fit into the trench opening in the first trenched electrode and leaving a gap between the first electrode and the second electrode; and (2) filling the gap between the first trenched electrode and the second trenched electrode with an electrolyte.

FIG. 4 is an exemplary illustration of combining two trenched electrodes (Structure 1 and Structure 2) to form an exemplary double layer capacitor. The first trenched electrode (Structure 2) contains cylindrical trench openings in a silicon substrate; and the second trenched electrode (Structure 1) contains a trench opening in a silicon substrate having a 3-dimensional shape complimentary to the cylindrical trench openings in the first trenched electrode. The remaining protruding cylindrical structures in the second trenched electrode (Structure 1) are substantially the same in shape as the cylindrical trenches in the first trenched electrode (Structure 2); but the protruding cylinders in Structure 1 have a diameter that is smaller than the diameter of the cylindrical trenches in Structure 2 (FIG. 2). The two trenched electrodes are combined by inserting the protruding cylinders in Structure 1 into the cylindrical trenches in Structure 2. The structures are aligned to leave a gap between the opposing surfaces of the two electrodes (no direct contact between the two electrodes). The gap is then filed with an electrolyte to form the electrochemical double layer capacitor.

In some embodiments, the process further comprises: (a) forming a first trench opening in a first substrate; (b) forming an electrode layer on the first substrate having the first trench opening therein, thereby producing the first trenched electrode; (c) forming a second trench opening in a second substrate, wherein the second trench opening in the second substrate having a 3-dimensional shape complimentary to the first trench opening in the first substrate and a remaining protruding structure substantially the same in shape as the first trench opening in the first substrate; and (d) forming an electrode layer on the second substrate having the second trench opening therein, thereby producing the second trenched electrode.

Figure 5:
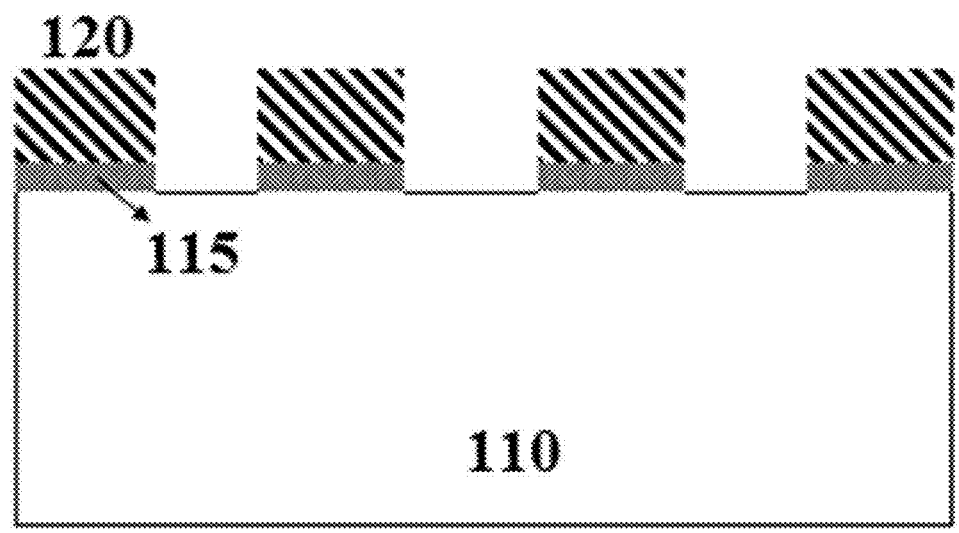
FIGS. 5-12 are schematic vertical cross-sectional views of exemplary embodiments in a wafer manufacturing process of making a double layer super/ultra-capacitor.
Figure 6:
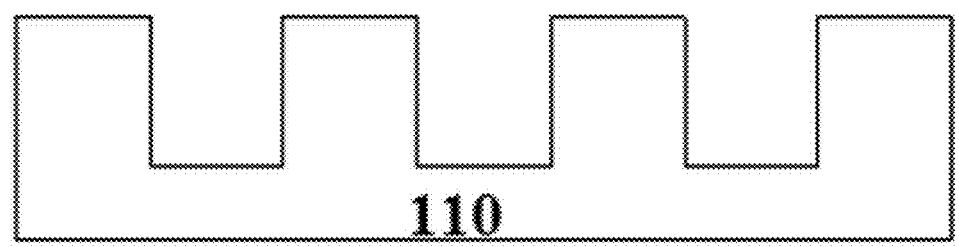

Referring to the figures, FIGS. 5 and 6 illustrate an exemplary process of forming trench openings in a substrate by a photolithography etching process. Specifically, as shown in FIG. 5, a highly doped Si substrate (110) is used as the starting material. An optional isolation layer (115) such as $SiO_2$ is applied through chemical vapor deposition (CVD) or thermal oxidation on the starting substrate material. Photoresist (120) is spin on the doped Si substrate and then exposed using a photolithography mask. As shown in FIG. 6, a trench is defined using a photolithography step by etch, or by removing the portion of silicon to create a Si (110) deep trench etch. Further, the photoresist (20) is then stripped off. In one embodiment, the trench depth is in the range of about 25 µm to about 75 µm deep.

Any substrate suitable for making a double layer capacitor can be used for the first substrate and/or the second substrate, for example, highly doped silicon, in either heavily doped P Type silicon or heavily doped N Type silicon. Alternatively, the starting substrate material layer can include other semiconductor material such as, but not limited to, germanium, gallium nitride, gallium arsenide, silicon carbide, amorphous silicon, and a combination of single and polycrystalline silicon. In some embodiments, the first substrate and the second substrate are highly doped silicon substrate. The trench openings may be formed by methods developed for semiconductor manufacturing such as photolithography techniques. For example, an optional isolation layer such as $SiO_2$ is applied through chemical vapor deposition (CVD) or thermal oxidation on the starting substrate material. Photoresist with thickness of 1 µm to 3 µm is spun over the isolation layer. A lithographic pattern of the trench design is then exposed and developed over a mask layer before etching. In one embodiment, the trench pattern is then etched using an anisotropic plasma dry etching process.

In some embodiments, the process comprises forming the trench openings in the substrate by photolithography etching. In some embodiments, the process comprises forming the first trench openings in the first substrate by photolithography etching. In some embodiments, the process comprises forming the second trench openings in the second substrate by photolithography etching.

The trench openings in the trenched electrodes may be a contiguous trench formed in the substrate or a plurality of individual trenches. In some embodiments, the trench opening is cylindrical in shape (e.g., Structure 2 in FIG. 2). In some embodiments, the trench opening is a contiguous trench and a remaining protruding structure is cylindrical in shape (e.g., Structure 1 in FIG. 2). In some embodiments, the first trench opening in the first substrate is cylindrical in shape having a first diameter and the protruding structure in the second substrate is cylindrical in shape having a second diameter, and the second diameter is smaller than the first diameter. In some embodiments, the first diameter is 20% larger than the second diameter. In one embodiment, the first trench opening in the first substrate comprising a cylinder of about 1 µm in diameter and about 25 µm to about 75 µm in depth. In one embodiment, the first trench opening in the first substrate comprising a cylinder of about 1 µm in diameter and about 25 µm to about 75 µm in depth and the protruding structure in the second substrate comprising a cylinder of about 0.8 µm in diameter and about 25 µm to about 75 µm in depth. Such electrodes can be assembled to form a super/ultra-capacitor wherein the protruding cylinders (about 0.8 µm in diameter) in the second trenched electrode substantially fit into the cylindrical trenches (about 1 µm in diameter) in the first trenched electrode leaving a gap (about 0.1 µm) between the surface of the first electrode and surface of the second electrode. Alternatively, other shapes, such as a hexagon, ellipse, a polygon or a derivative of a rounded corner polygon can be used to serve as the same functional purpose as the cylinder.

Once the trenches are formed in the substrate, an electrode material is then formed in the trenches to make the electrode layer. The electrode layer may be formed by converting a top layer of an appropriate substrate material into an electrode material, or by depositing a new layer of an electrode material on the surface of the substrate having the trench openings therein.

In some embodiments, the electrode layer is formed on the substrate by converting a layer of the substrate material into an electrode material. In some embodiments, the substrate is a highly doped silicon substrate, and the process comprises forming an electrode layer on the first substrate having the first trench opening therein comprising wet-etching a layer of the highly doped silicon substrate to form a porous silicon electrode. In some embodiments, the process comprises forming an electrode layer on the second substrate having the second trench opening therein comprising wet-etching a layer of the highly doped silicon substrate to form a porous silicon electrode.

In some embodiments, the electrode layer is formed on the substrate by depositing a layer of an electrode material on the surface of the substrate having the trench openings therein. In some embodiments, the process further comprises forming a metal barrier layer in the substrate with trench openings prior to forming the electrode layer. The electrode layer is then formed by sputtering an electrode material on the metal barrier layer. In some embodiments, the process comprises the steps of forming a metal barrier layer in the first substrate with the first trench opening and forming an electrode layer on the metal barrier layer by sputtering an electrode material on the metal barrier layer. In some embodiments, the process comprises the steps of forming a metal barrier layer in the second substrate with the second trench opening and forming an electrode layer on the metal barrier layer by sputtering an electrode material on the metal barrier layer.

Figure 7:
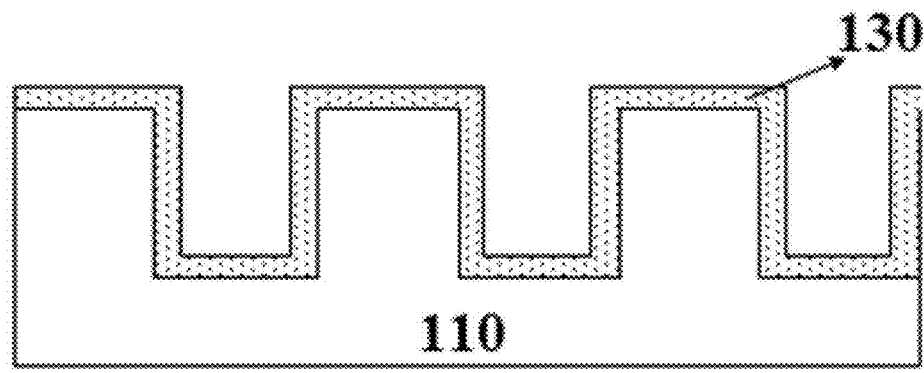
Figure 9:
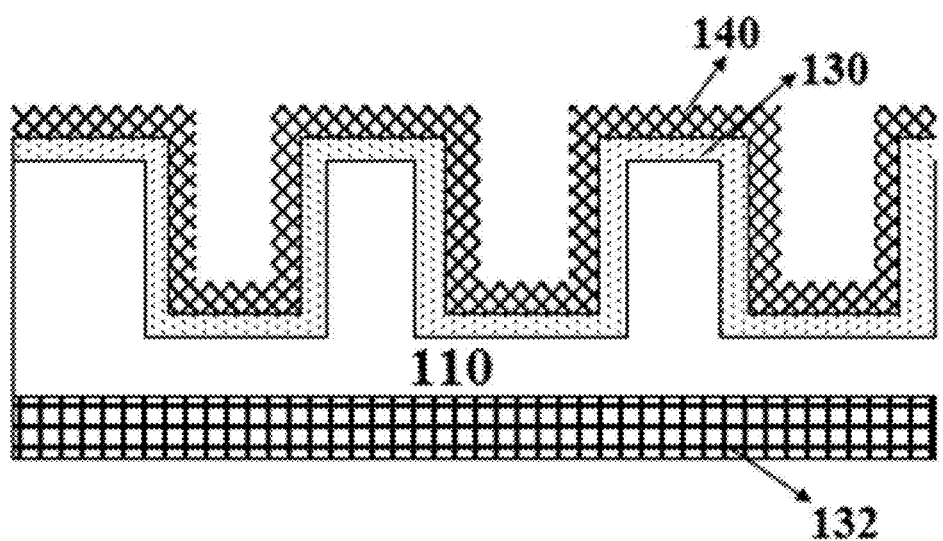

FIGS. 7 and 9 are illustrative diagrams showing an exemplary process of forming a metal barrier layer and then an electrode layer on a substrate having trench openings therein. FIG. 7 shows a metal barrier layer (130) formed on the substrate (110) having trench openings therein. FIG. 9 shows an electrode layer such as polypyrrole (PPY) (140) deposited along the metal barrier to form the electrode of the capacitor.

Materials suitable for the metal barrier layer include, but are not limited to, Ti, TiN, Ni, NiAu, TiW, NiPdAu, TiS, Cr, Au, Pt and Pd. In some embodiments, the metal barrier uses a Ti or TiN material. Materials suitable for the electrode layer include, but are not limited to, polypyrrole (PPY), activated carbon, graphene or carbon nanotubes.

The electrolyte (e.g., an electrolytic acid) between the electrodes is used to polarize the high surface area of the electrodes. The charges within the electrodes are held between two ionic charges (distance d) from the electrolyte (e.g., an electrolytic acid) creating the Helmholtz layer. The capacitance (C) of plate capacitors can be calculated with equation $C=(\epsilon*A)/d$, where $\epsilon$ is the permittivity of the capacitor material, A is the surface area of the electrode plate, and d is the distance between the ionic charges. Due to the very short distance d, typically less than 0.4 µm, a very high capacitance compared to conventional capacitors can be achieved using the Helmholtz layer. Examples of electrolytes suitable for use in the electrochemical double layer capacitor of this invention include, but are not limited to, electrolytic acid, KOH/acetonitrile, a gel electrolyte.

Figure 11:
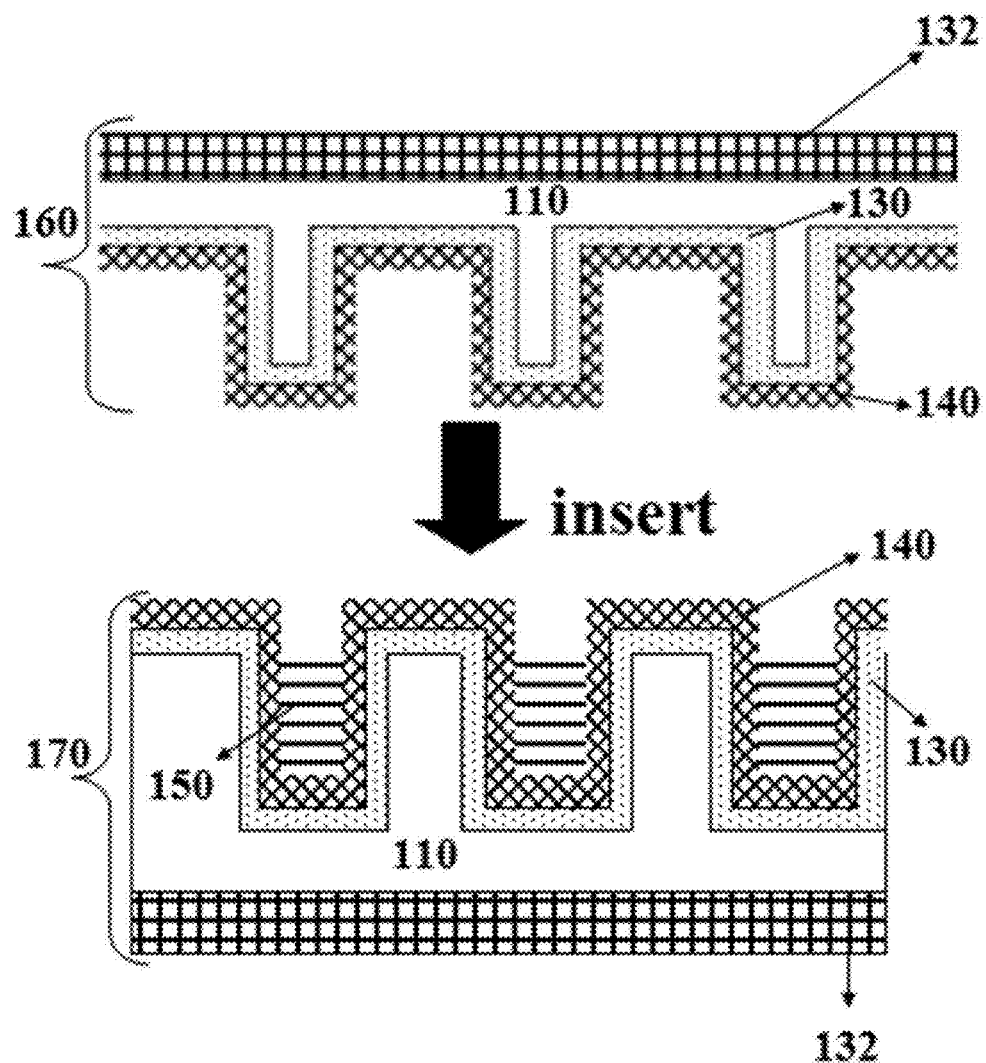
Figure 12:
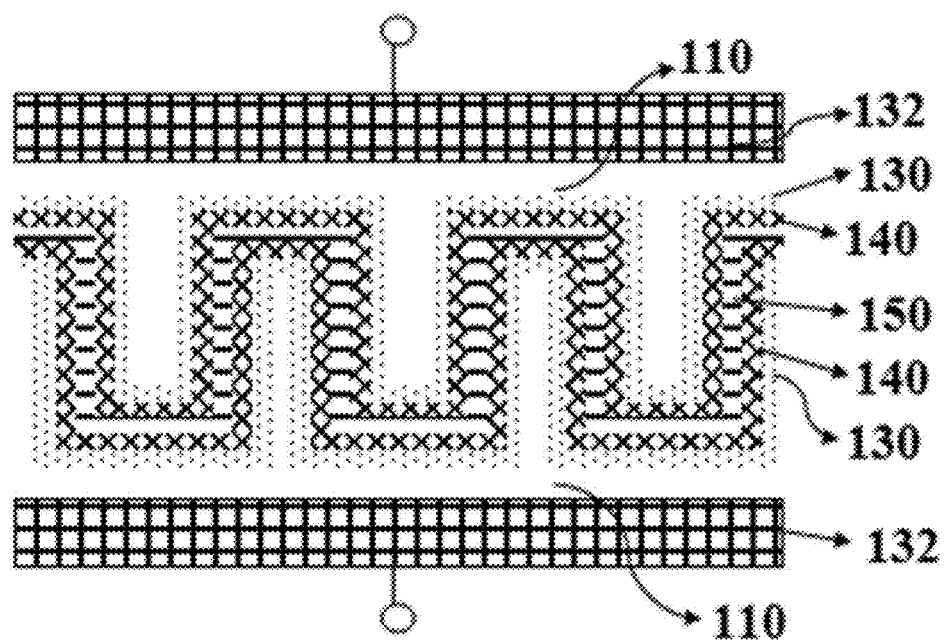

The shape and size of the trenches as well as the spacing between the individual trenches can be adjusted for the electrodes to ensure complimentary matching and control the size of the gap between the electrodes when combined into a double layer capacitor. In some embodiments, trenches are formed in a substrate (for example evenly spaced groves) such that the trenches and the remaining protruding structures are complimentary in shape. For example, an electrode shown in FIG. 9 has groves (trenches) and protrusions that are complementary in shape such that two of such electrodes can be combined as illustrated in FIG. 11 to form a capacitor as shown in FIG. 12.

In some embodiments of the process, the first electrode and the second electrode are combined and the gap between the electrodes is then filled with an electrolyte (such as an electrolytic acid). In some other embodiments of the process, the trenches in one of the electrodes may be filled with an electrolyte, and the other electrode is then inserted into the electrode having the electrolyte filled therein. Such process is especially useful in case when the electrolyte has poor fluidity (for example a gel electrolyte) and filling a narrow gap between two combined electrodes becomes difficult.

In some embodiments, provided is a process of making an electrochemical double layer capacitor comprising the steps of:
  a) providing a first substrate;
  b) forming a first trench opening in the first substrate;
  c) optionally forming a metal barrier layer on the first substrate having the first trench opening therein;
  d) forming an electrode layer on the first substrate, thereby producing the first trenched electrode;
  e) providing a second substrate;
  f) forming a second trench opening in the second substrate, wherein the second trench opening in the second substrate having a 3-dimensional shape complimentary to the first trench opening in the first substrate and a remaining protruding structure substantially the same in shape as the first trench opening in the first substrate;
  g) optionally forming a metal barrier layer on the second substrate having the second trench opening therein;
  h) forming an electrode layer on the second substrate, thereby producing the second trenched electrode;
  i) combining the first trenched electrode with the second trenched electrode such that the protruding structure in the second trenched electrode substantially fit into the trench opening in the first trenched electrode and leaving a gap between the first electrode and the second electrode; and
  j) filling the gap between the first trenched electrode and second trenched electrode with an electrolyte (e.g., an electrolytic acid).

In some embodiments, provided is a process of making an electrochemical double layer capacitor comprising the steps of:
  a) providing a first substrate (e.g., highly doped silicon);
  b) forming a first trench opening in the first substrate;
  c) forming a metal barrier layer (e.g., comprising a Ti or TiN) on the first substrate having the first trench opening therein;
  d) sputtering an electrode layer on the metal barrier layer on the first substrate, thereby producing the first trenched electrode;
  e) providing a second substrate (e.g., highly doped silicon);
  f) forming a second trench opening in the second substrate, wherein the second trench opening in the second substrate having a 3-dimensional shape complimentary to the first trench opening in the first substrate and a remaining protruding structure substantially the same in shape as the first trench opening in the first substrate;
  g) forming a metal barrier layer (e.g., comprising a Ti or TiN) on the second substrate having the second trench opening therein;
  h) sputtering an electrode layer on the metal barrier layer on the second substrate, thereby producing the second trenched electrode;
  i) combining the first trenched electrode with the second trenched electrode such that the protruding structure in the second trenched electrode substantially fit into the trench opening in the first trenched electrode and leaving a gap between the first electrode and the second electrode; and
  j) filling the gap between the first trenched electrode and second trenched electrode with an electrolyte (e.g., an electrolytic acid).

In some embodiments, provided is a process of making an electrochemical double layer capacitor comprising the steps of:
   a) providing a first substrate, wherein the first substrate is a highly doped silicon substrate;
   b) forming a first trench opening in the first substrate;
   c) wet-etching a layer of the highly doped silicon on the first substrate to form a porous silicon electrode layer, thereby producing the first trenched electrode;
   d) providing a second substrate, wherein the second substrate is a highly doped silicon substrate;
   e) forming a second trench opening in the second substrate, wherein the second trench opening in the second substrate having a 3-dimensional shape complimentary to the first trench opening in the first substrate and a remaining protruding structure substantially the same in shape as the first trench opening in the first substrate;
   f) wet-etching a layer of the highly doped silicon on the second substrate to form a porous silicon electrode layer, thereby producing the second trenched electrode;
   g) combining the first trenched electrode with the second trenched electrode such that the protruding structure in the second trenched electrode substantially fit into the trench opening in the first trenched electrode and leaving a gap between the first electrode and the second electrode; and
   h) filling the gap between the first trenched electrode and second trenched electrode with an electrolyte (e.g., an electrolytic acid).

In some instances, the trenches in a first trenched electrode is partially filled with an electrolyte, and a second trenched electrode is then combined by inserting the protruding structures of the second trenched electrode into the partially filled trenches in the first trenched electrode, forcing the electrolyte to fill the gap formed between the first and the second trenched electrodes. Thus, in some embodiments, provide is a method/process for making an electrochemical double layer capacitor comprising:
   a) producing a first trenched electrode by forming an electrode layer on a first substrate having a first trench opening therein;
   b) producing a second trenched electrode by forming an electrode layer on a second substrate having a second trench opening therein, wherein the second trench opening in the second substrate having a 3-dimensional shape complimentary to the first trench opening in the first substrate and a remaining protruding structure substantially the same in shape as the first trench opening in the first substrate;
   c) partially filling the trench opening in the first trenched electrode with an electrolyte (e.g., a gel electrolyte); and
   d) combining the second trenched electrode with the first trenched electrode having the electrolyte partially filled therein, such that the protruding structure in the second trenched electrode substantially fit into the trench opening in the first trenched electrode.

In some of these embodiments, the process further comprises forming the first trench opening in the first substrate and forming the second trench opening in the second substrate. In some of these embodiments, the process comprises forming the trench openings by photolithography etching. In some of these embodiments, the first and/or second substrate is a highly doped silicon substrate, and forming the electrode layer on the first and/or second substrate comprises wet-etching a layer of the highly doped silicon substrate to form a porous silicon electrode layer. In some of these embodiments, the process further comprises forming (e.g., sputtering) a metal barrier layer on the first and/or second substrate prior to forming the electrode layer on the first and/or the second substrate, and forming the electrode layer on the first and/or second substrate comprises sputtering an electrode material on the metal barrier layer. In some of these embodiments, the trench opening in the first trenched electrode and the protruding structure in the second trenched electrode are cylindrical in shape. In some of these embodiments, the trench opening (e.g., rectangular groves) in a trenched electrode and the protruding structure (e.g., rectangular protrusions) in the trenched electrode are complementary in shape.

In some embodiments, provided is a process of making an electrochemical double layer capacitor comprising the steps of:
   a) forming a first trench opening in a first substrate;
   b) optionally forming a metal barrier layer on the first substrate having the first trench opening therein;
   c) forming an electrode layer on the first substrate, thereby producing the first trenched electrode;
   d) forming a second trench opening in a second substrate, wherein the second trench opening in the second substrate having a 3-dimensional shape complimentary to the first trench opening in the first substrate and a remaining protruding structure substantially the same in shape as the first trench opening in the first substrate;
   e) optionally forming a metal barrier layer on the second substrate having the second trench opening therein;
   f) forming an electrode layer on the second substrate, thereby producing the second trenched electrode;
   g) partially filling the trench opening in the first trenched electrode with an electrolyte (e.g., a gel electrolyte); and
   h) combining the second trenched electrode with the first trenched electrode having the electrolyte partially filled therein, such that the protruding structure in the second trenched electrode substantially fit into the trench opening in the first trenched electrode and leaving a gap between the first electrode and the second electrode filled with the electrolyte.

Referring to the drawings, FIGS. 5-12 show schematics demonstrating an exemplary process of making a double layer super/ultra-capacitor using a wafer manufacturing process.

Figure 10:
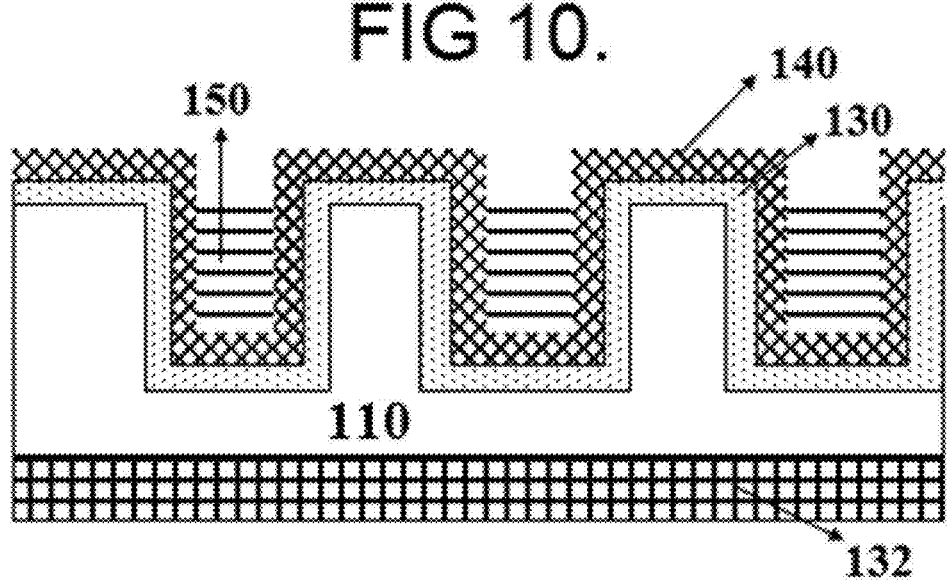

FIGS. 5 and 6 are diagrams illustrating exemplary steps for forming a trenched opening in a substrate (110) by photolithography etching. FIGS. 7 and 9 are diagrams illustrating exemplary steps for forming a metal barrier layer (130) on a substrate having second trench openings therein and then forming an electrode layer (140) on the metal barrier layer. FIG. 10 is a diagram illustrating a trenched electrode having an electrolyte (150) (e.g., an electrolytic acid, solid state (gel) or liquid acid) is deposited into the trench region. FIG. 11 is a diagram illustrating combination of a trenched electrode having an electrolyte partially filled therein (170) and a trenched electrode having a complementary topology (160) to form an electrochemical double layer capacitor as illustrated by the diagram in FIG. 12.

In some embodiments, in order to complete a super/ultracapacitor with packaging, the substrate (such as a silicon wafer) may be thinned to a desired thickness; one or more metal conductors may be deposited on the backside, which provide conductive contact points for connection with other devices, for example, a device for charging the super/ultracapacitor or a device for drawing power from a charged super/ultra-capacitor.

In some embodiments, in any of the process for making an electrochemical double layer capacitor described herein, the process further comprises back grinding the first substrate and the second substrate and depositing a conductive metal material. In some of these embodiments, the conductive metal material comprises a Ti—Ni—Ag tri-metal material.

Figure 8:
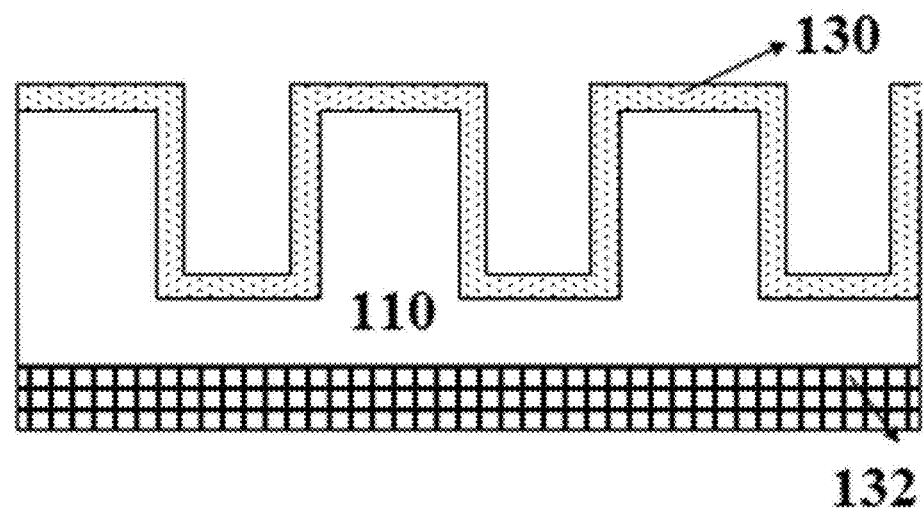

As shown in FIG. 8, as desired by the final packaging type, the substrate wafer is thinned. Some silicon is removed to a thickness to fit the require package type. Metal is then deposited or plated on the backside. The metal system (132) will depend on the type of contact needed for the package type, e.g., solder or eutectic. In one embodiment, a tri-level metal system is used with Titanium, Nickel and Silver with a thickness of 2 k Angstroms, 3 k Angstroms and 10 k Angstroms, respectively. FIG. 12 shows an exemplary final structure with both electrodes, sealed as a single package device.

In order to facilitate alignment of the two electrodes when they are combined to form the double layer capacitor, markings and tags can be used on the substrate. Thus in any of the embodiments of the process for making an electrochemical double layer capacitor described herein, the first substrate and the second substrate comprise set markings for alignment in the combining step.

The double layer super/ultra-capacitor design illustrated in FIGS. 2-4 can be produced using a wafer process detailed herein. In one embodiment, referring to FIGS. 2-4, the device is fabricated using the process as FIGS. 5-12, but with using a cylindrical shape according to the following detail steps. As shown in FIG. 2, a highly doped Silicon wafer is used with two complementary cylindrical trenches with a trench depth defined as D, and a trench width defined as d. In one embodiment, the trenched width is 1.2 d with a trench space of 0.5 d. As shown in FIG. 3, in one embodiment, structure 1 as defined as having a trench space of 0.5 d, while structure 2 has a smaller trench space of 0.3 d and a large trench diameter of 1.2 d. In this embodiment, the space or gap allowed between the two electrodes is about 0.1 d when the two structures are assembled together. As shown in FIG. 4, in one embodiment, structure 1 having the smaller trench diameter is inserted into structure 2.

Thus, in some embodiments, provided is a process of making an electrochemical double layer capacitor comprising the steps of:
a) providing a first substrate;
b) forming a cylindrical trench opening in the first substrate;
c) optionally forming a metal barrier layer on the first substrate having the cylindrical trench opening therein;
d) forming an electrode layer on the first substrate, thereby producing the first trenched electrode;
e) providing a second substrate;
f) forming a protruding cylindrical structure in the second substrate;
g) optionally forming a metal barrier layer on the second substrate having the protruding cylindrical structure thereon;
h) forming an electrode layer on the second substrate, thereby producing the second trenched electrode;
i) combining the first trenched electrode with the second trenched electrode such that the protruding cylindrical structure in the second trenched electrode substantially fit into the cylindrical trench opening in the first trenched electrode and leaving a gap between the first electrode and the second electrode; and
j) filling the gap between the first trenched electrode and second trenched electrode with an electrolyte (e.g., an electrolytic acid).

In some of these embodiments, the cylindrical trench opening in the first substrate comprises a cylinder of about 1 μm in diameter and about 25 μm to about 75 μm in depth. In some of these embodiments, the protruding cylindrical structure in the second substrate comprises a cylinder of about 0.8 ∞m in diameter and about 25 μm to about 75 μm in depth. In some of these embodiments, the cylindrical trench opening in the first trenched electrode comprises a cylinder of about 1 μm in diameter and about 25 μm to about 75 μm in depth, the protruding cylindrical structure in the second trenched electrode comprises a cylinder of about 1 μm in diameter and about 25 μm to about 75 μm in depth, and the gap between the surface of the first trenched electrode and the surface of the second trenched electrode is about 0.1 μm.

Also provided is a double layer super/ultra-capacitor produced by a wafer manufacturing process (e.g., a photolithography etching process) detailed herein.

Die-Saw Process

In another aspect, provided is a die-saw process for making an electrochemical double layer capacitor, the process comprising the steps of: (1) providing a conductive plate, wherein the conductive plate is attached to an insulating substrate board via a non-conductive adhesive layer and is fitted with contact pads on both edges; (2) forming a plurality of trenches by sawing the conductive plate at a predetermined pitch size to a depth where the adhesive layer is exposed, wherein the trenches having a floor composed of the non-conductive adhesive layer and side walls composed of the conductive plate; (3) coating the floor and the side walls of the trenches with a layer of electrode material to form electrodes; (4) sawing through the layer of electrode material on the floor of the trenches to form narrow trenches; (5) inserting separators into the narrow trenches, wherein the separators are attached to a frame comprising side walls; (6) sealing the sidewalls and the trench floor by flowing a framing adhesive around the separators; and (7) injecting electrolyte to fill (partially or fully) gaps formed between the electrodes and the separators. In some embodiments, the process further comprises: (8) injecting an adhesive to seal the topside; (9) exposing the contact pads; (10) attaching polar metal bars to the contact pads; and (11) assembling into casing. In some embodiments, the insulating substrate board is marked with alignment marks.

In some embodiments, the non-conductive adhesive is a wax or a glue. In some embodiments, the conductive plate comprises highly doped silicon. In some embodiments, the layer of electrode material comprises metal nano structure layer and a conductive metal oxide layer. In some embodiments, the electrode material comprises activated carbon, graphene, carbon nanotubes, or PPY. In some embodiments, the electrolyte comprising sulfuric acid or KOH/acetonitrile.

Referring to the drawings, FIGS. 13-29 show schematics demonstrating an exemplary process of making a double layer super/ultra-capacitor using a die-saw manufacturing process. FIGS. 13-22 show lateral cross-sectional views of the devices in the process; while FIGS. 23-29 show exemplary 3-D diagrams.

Figure 13:
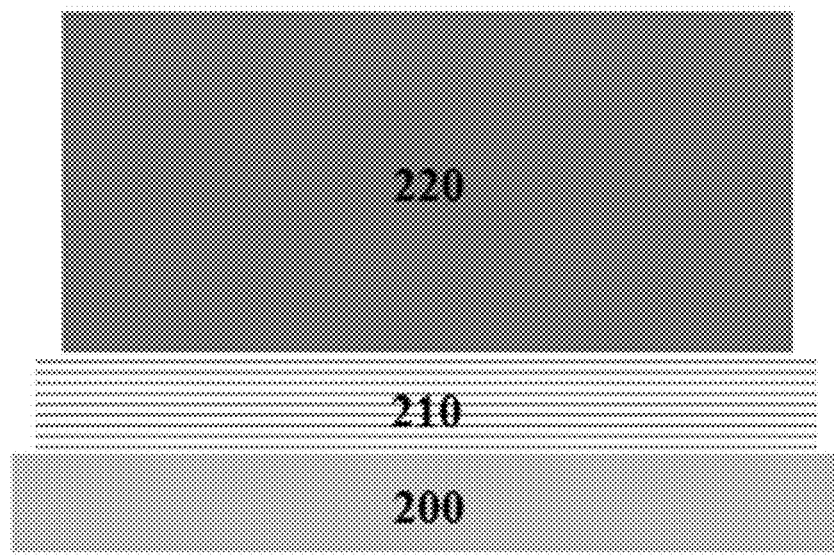
Figure 23:
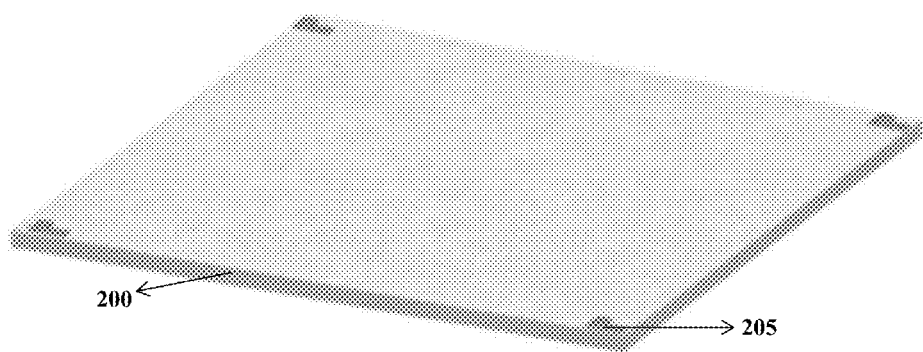
FIGS. 23-29 are schematic 3-dimensional views of exemplary embodiments in a die-saw process of making a double layer super/ultra-capacitor.
Figure 24:
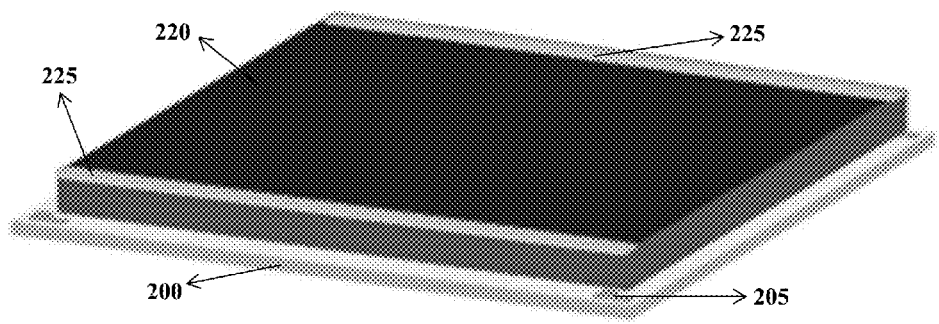
Figure 25:
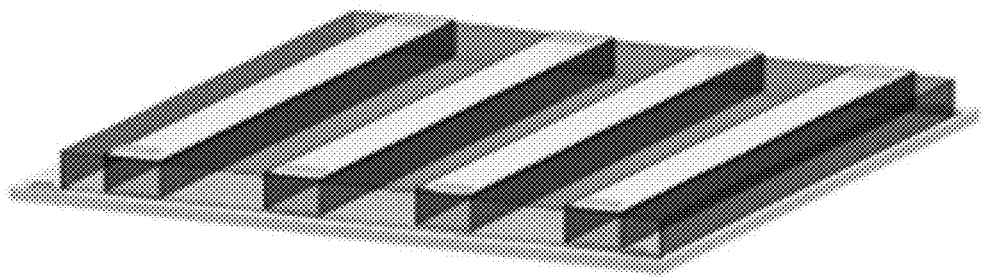
Figure 26:
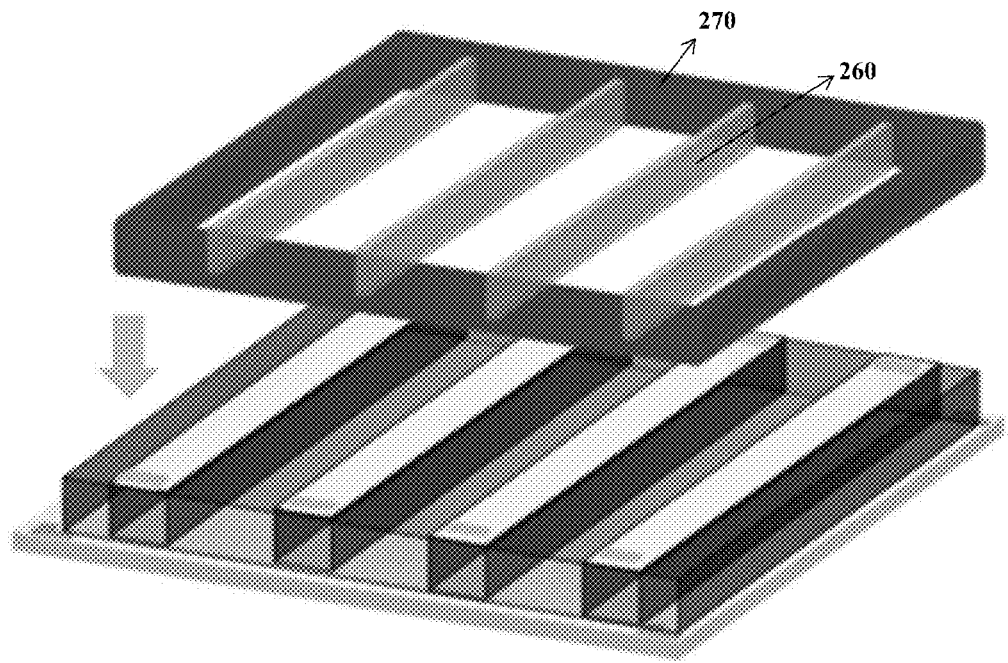
Figure 27:
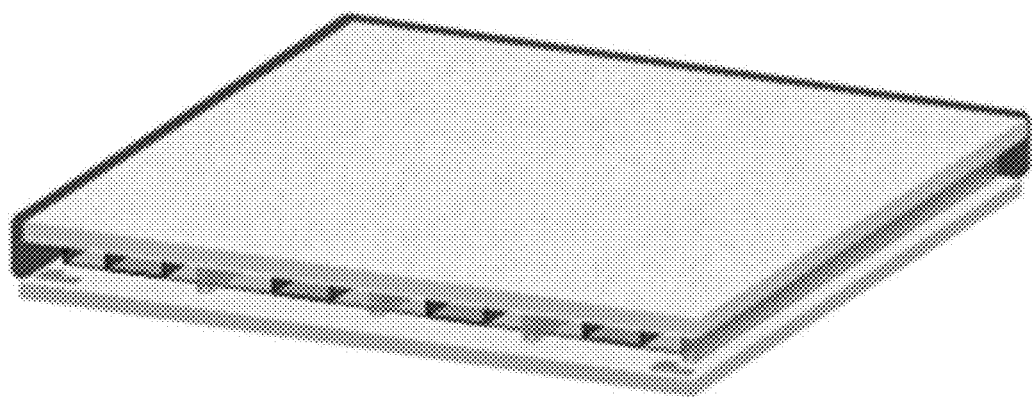

As shown in FIG. 13, an insulating substrate board (200) is used as the starting material. The substrate board may have alignment marks (205) (FIG. 23). A conductive plate (220) is then attached to the substrate board with an adhesive layer (210), e.g. wax or glue. A 3-D form of this structure is shown in FIG. 24, where the conductive plate may be further fitted with two conductive stripes (225) on two opposing edges.

Figure 14:
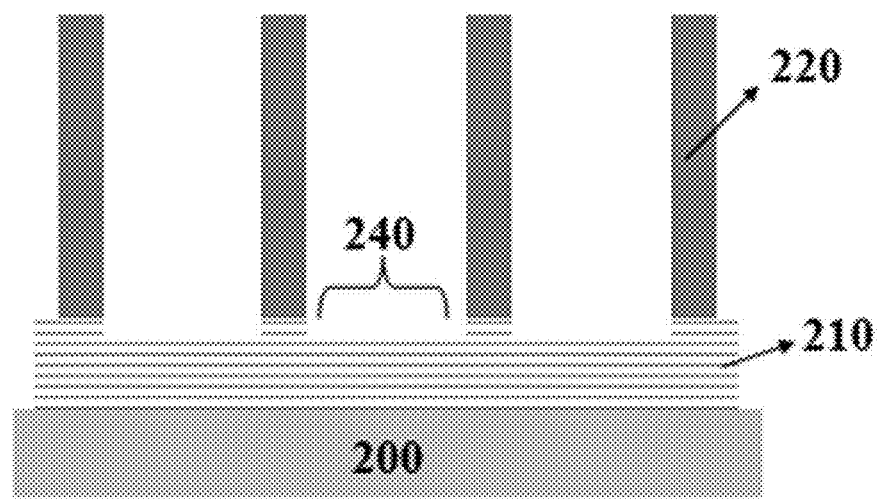

In step (2), a plurality of trenches (240) is formed by sawing the conductive plate at a predetermined pitch size to a depth where the adhesive layer is exposed, wherein the trenches having a floor composed of the non-conductive adhesive layer and side walls composed of the conductive plate. As shown in FIG. 14, a blade saw with a width of the determined pitch size is sawed through the conductive plate (220) and into the adhesive (210) creating a trench or trenches (240) in the conductive plate. In one embodiment, the trench width is about 5 to 30 μm.

In step (3) the floor and the side walls of the trenches (240) are coated with a layer of electrode material (250) to form electrodes. In one embodiment, as shown in FIG. 15, an electrode layer such as polypyrrole (PPY) (250) is deposited along the conductive plate and trench area to form the electrode of the capacitor.

In step (4), narrow trenches (245) are formed in the floor of the trenches (240) sawing through the layer of electrode material on the floor of the trenches. As shown in FIG. 16, a narrow blade is used for a die saw through the trench to separate the conductive layer for the separator to be inserted. In one embodiment, the narrow trench has a width of about 1 μm to about 5 μm. A 3-D form of this structure is shown on FIG. 25.

Figure 17:
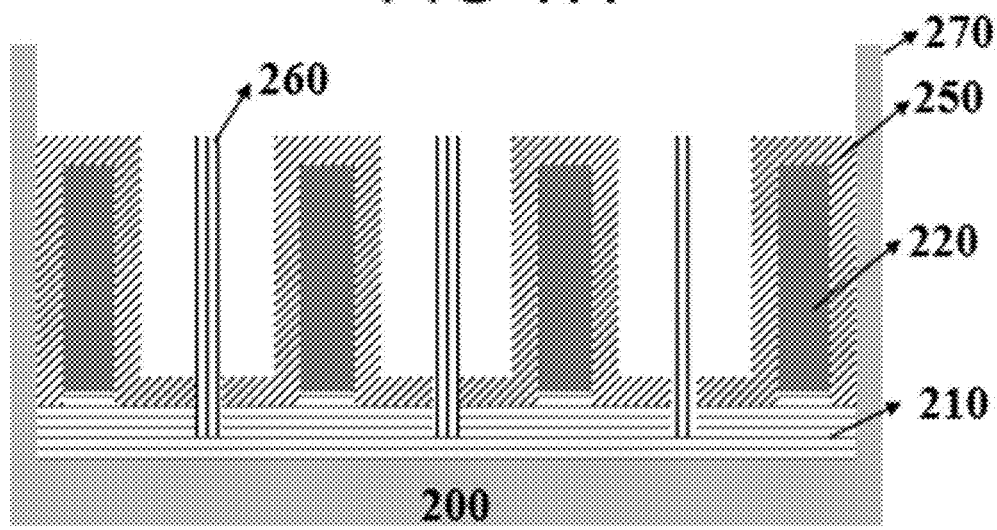

In step (5), separators (260) are inserted into the narrow trenches (245). The separators may be attached to a frame comprising side walls. In step (6), the sidewalls and the trench floor are sealed by flowing a framing adhesive around the separators. As shown in FIG. 17, a separator (260) is inserted into the narrow trench along with a specifically designed frame to seal the both the sidewalls and the bottom frame. An adhesive, (e.g. glue or wax) is then used to reflow to seal both the sidewalls and bottom casing (270). A 3-D form of this structure is shown on FIG. 26 (also showing the frame with side walls).

Figure 18:
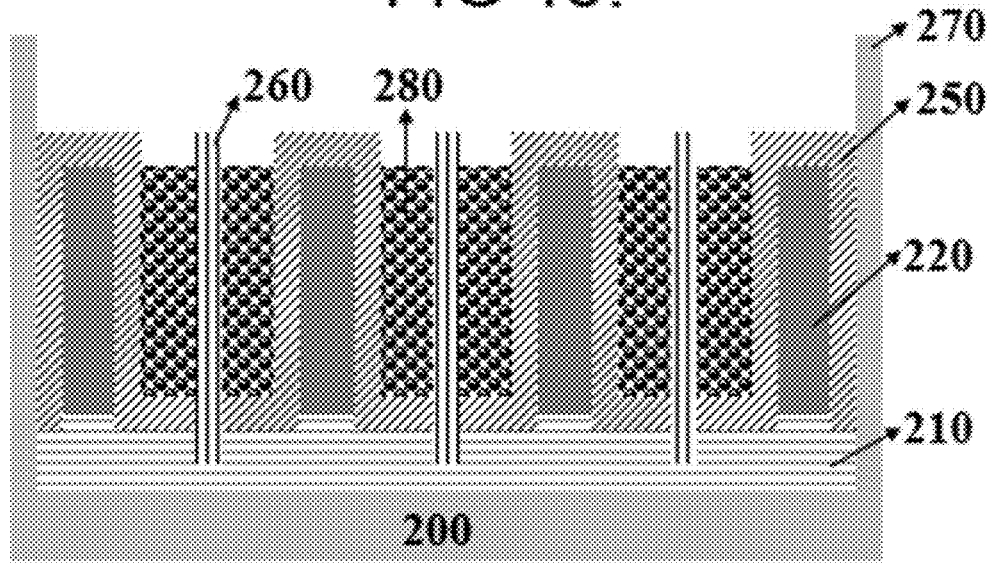

In step (7), an electrolyte (280) is injected into the remaining space in the trenches (240) to partially fill the gaps between the electrodes and the separators. As shown in FIG. 18, an electrolytic acid, solid state (gel) or liquid acid (280) is deposited into the trench region between the electrodes and separators.

Figure 19:
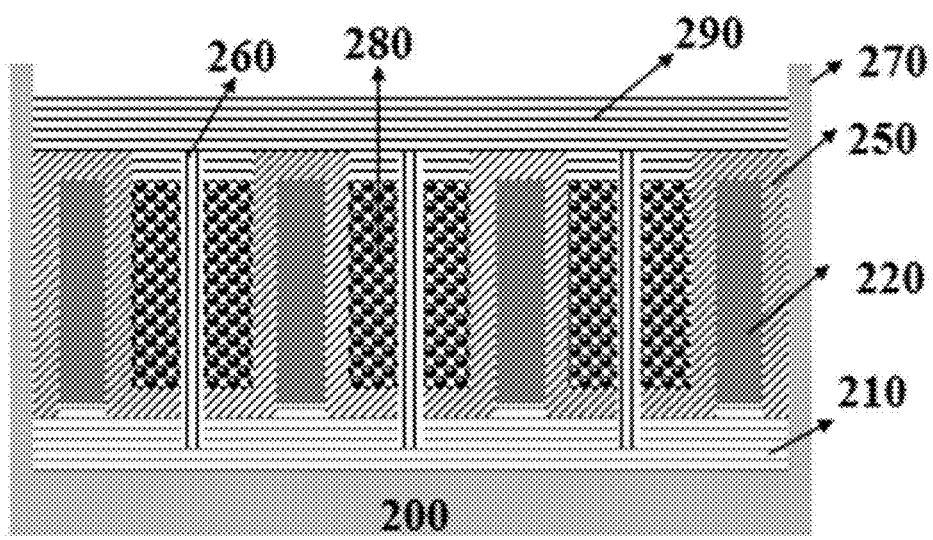

In step (8), an adhesive is injected to seal the topside. As shown in FIG. 19, an adhesive, (e.g. glue or wax) is then used to seal the top side of the casing (290). A 3-D form of this structure is shown on FIG. 27.

Figure 20:
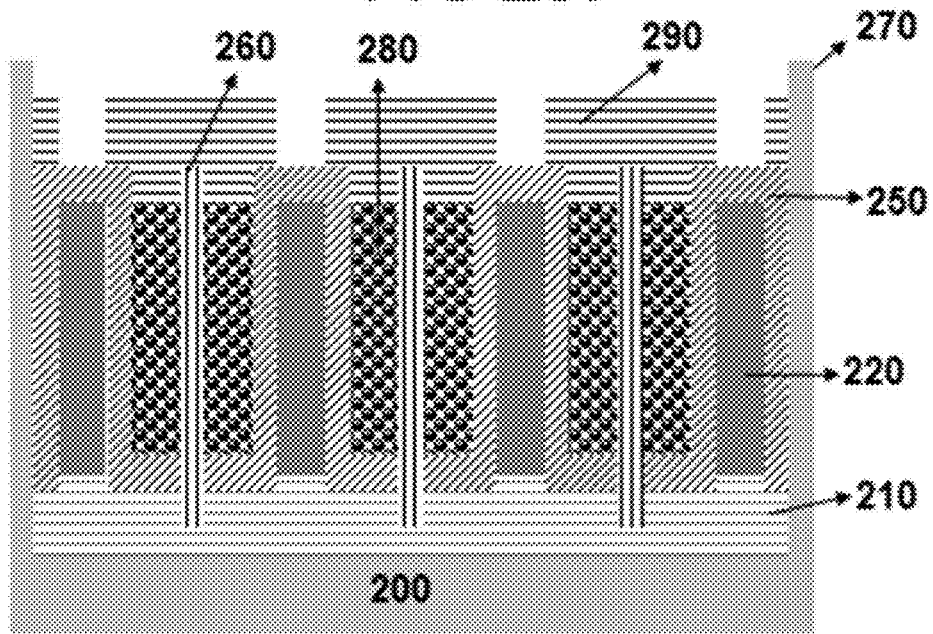
Figure 21:
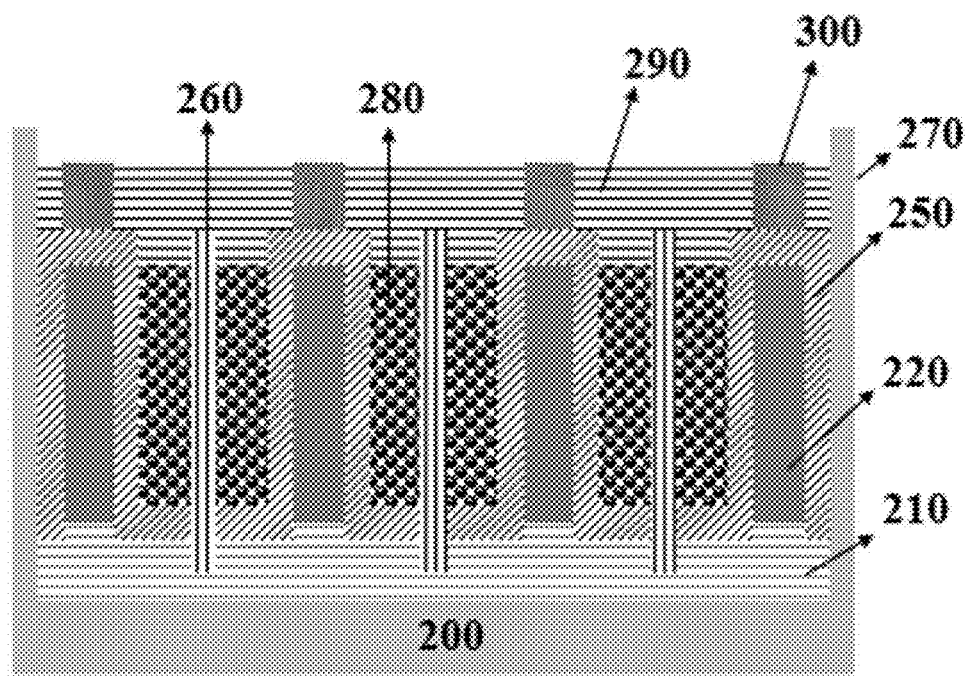
Figure 22:
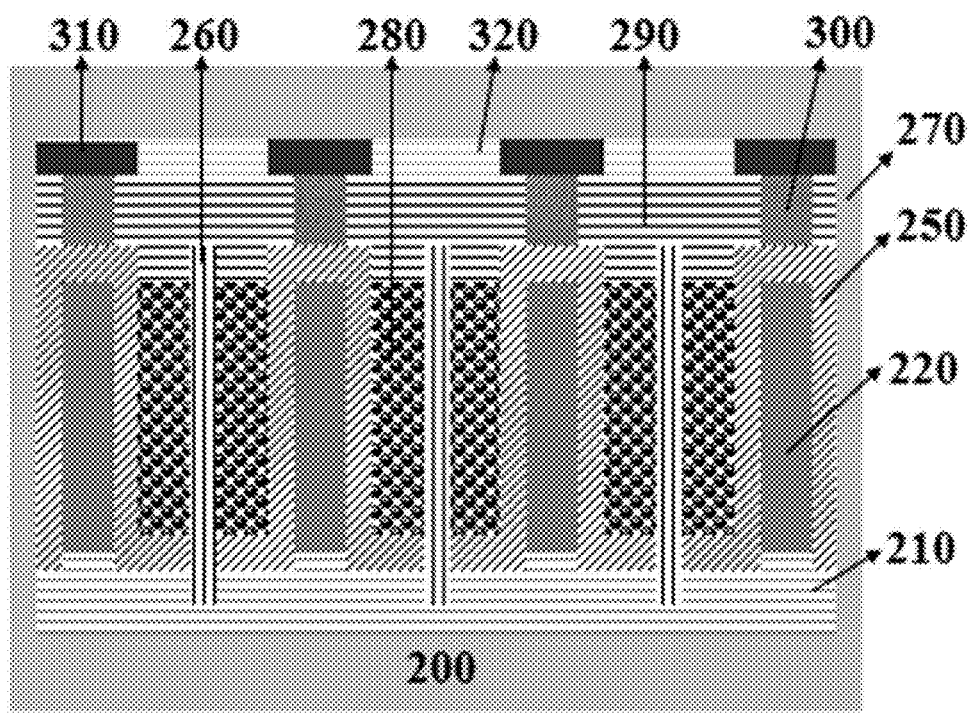
Figure 28:
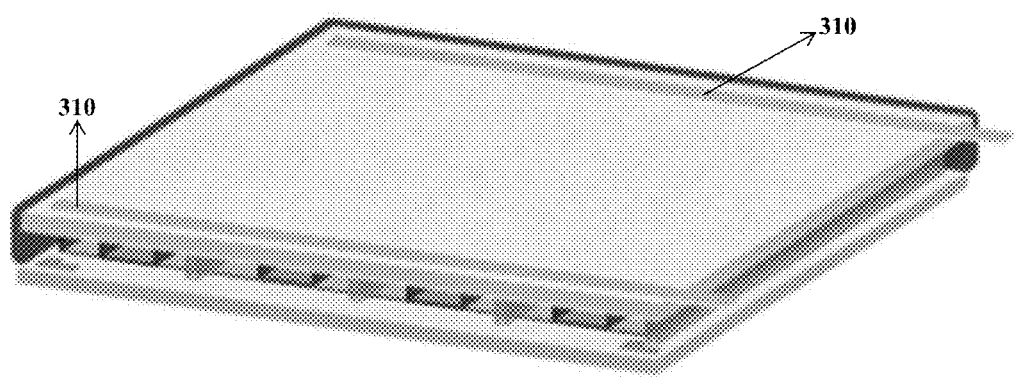
Figure 29:
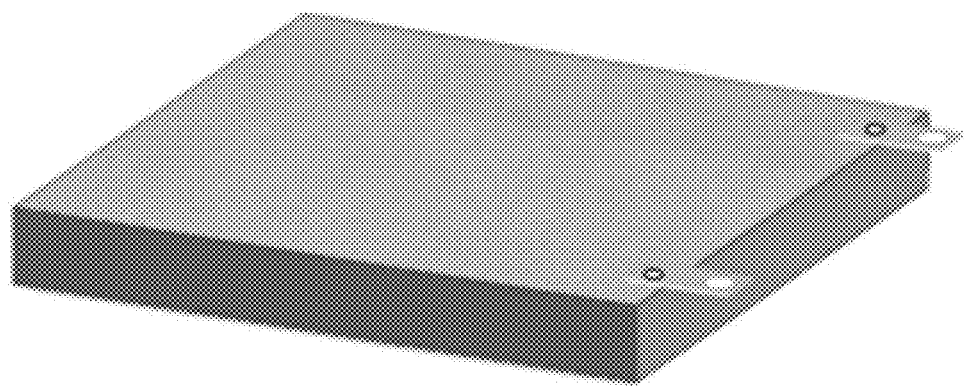

In the remaining steps (9)-(11), the contact pads are exposed; polar metal bars are attached to the contact pads; and the capacitor is assembled into casing. As shown in FIG. 20, using a removal or etching tool, a trench is created to expose the contact area. In one embodiment, a hot air nozzle is used to expose the contact. A contact is then made to the metal using an ENIG Plating Ni/Au or NiPdAu bump (300) process (FIG. 21). A final structure is shown in FIG. 22 with a solder bar used (310) for the contact and seal from the top with an epoxy material or wax. 3-D illustrations of this structure are shown in FIGS. 28 and 29.

In some embodiments, provided is a process of making an electrochemical double layer capacitor comprising the steps of:
 a) providing an insulating substrate board;
 b) placing a non-conductive adhesive (e.g., a wax or a glue) layer on the insulating substrate board;
 c) attaching a conductive plate (e.g., a highly doped silicon plate) onto the non-conductive adhesive layer, wherein the conductive plate is fitted with contact pads on both edges;
 d) forming a plurality of trenches by sawing the conductive plate at a predetermined pitch size to a depth where the adhesive layer is exposed, wherein the trenches having a floor composed of the non-conductive adhesive layer and side walls composed of the conductive plate;
 e) coating the floor and the side walls of the trenches with a layer of electrode material to form electrodes;
 f) sawing through the layer of electrode material on the floor of the trenches to form narrow trenches;
 g) inserting separators into the narrow trenches, wherein the separators are attached to a frame comprising side walls;
 h) sealing the sidewalls and the trench floor by flowing a framing adhesive (e.g., a glue or wax) around the separators; and
 i) injecting electrolyte to fill (partially or fully) gaps formed between the electrodes and the separators.

In some embodiments, the die-saw process further comprises the steps of:
 j) injecting an adhesive to seal the topside;
 k) exposing the contact pads;
 l) attaching polar metal bars to the contact pads; and
 m) assembling into casing.

In some embodiments, the process further comprises marking the insulating substrate board with alignment marks. In some of these embodiments, the layer of electrode material comprises metal nano structure layer and a conductive metal oxide layer. In some of these embodiments, the electrode material comprises activated carbon, graphene, carbon nanotubes, or PPY.

Further provided is an electrochemical double layer super/ultra-capacitor produced by a die-saw manufacturing process detailed herein.

The electrochemical double layer capacitors or super/ultra-capacitors detailed herein may be assembled together, for example, by connecting in series and/or in parallel to make a capacitor assembly. Thus provided is a double layer capacitor assembly comprising one or more of the double layer capacitors detailed herein and/or produced by a wafer manufacturing process and/or a die-saw manufacturing process detailed herein.

EXEMPLARY EMBODIMENTS

The invention is further described by the following embodiments. The features of each of the embodiments are combinable with any of the other embodiments where appropriate and practical.

Embodiment 1

In one embodiment, the invention provides a process of making an electrochemical double layer capacitor comprising the steps of:
 a) producing a first trenched electrode by forming an electrode layer on a first substrate having a first trench opening therein;
 b) producing a second trenched electrode by forming an electrode layer on a second substrate having a second trench opening therein, wherein the second trench opening in the second substrate having a 3-dimensional shape complimentary to the first trench opening in the first substrate and a remaining protruding structure substantially the same in shape as the first trench opening in the first substrate;
c) combining the first trenched electrode and the second trenched electrode such that the protruding structure in the second trenched electrode substantially fit into the trench opening in the first trenched electrode and leaving a gap between the first electrode and the second electrode; and
d) filling the gap between the first trenched electrode and second trenched electrode with an electrolyte.

Embodiment 2

In a further embodiment of embodiment 1, the process further comprises forming the first trench opening in the first substrate and forming the second trench opening in the second substrate.

Embodiment 3

In a further embodiment of embodiment 2, the steps of forming the first trench opening in the first substrate and forming the second trench opening in the second substrate comprises photolithography etching.

Embodiment 4

In a further embodiment of any one of embodiments 1 to 3, the first substrate and the second substrate are highly doped silicon substrate.

Embodiment 5

In a further embodiment of embodiment 4, forming an electrode layer on the first and/or second substrate comprises wet-etching a layer of the highly doped silicon substrate to form a porous silicon electrode layer.

Embodiment 6

In a further embodiment of any one of embodiments 1 to 4, the process further comprises forming a metal barrier layer on the first substrate prior to forming the electrode layer on the first substrate and/or forming a metal barrier layer on the second substrate prior to forming the electrode layer on the second substrate.

Embodiment 7

In a further embodiment of embodiment 6, forming the electrode layer on the first substrate and/or forming the electrode layer on the second substrate comprises sputtering an electrode material on the metal barrier layer.

Embodiment 8

In a further embodiment of embodiment 6 or 7, the metal barrier layer in the first substrate comprises Ti or TiN.

Embodiment 9

In a further embodiment of any one of embodiments 6 to 8, the electrode material is polypyrrole (PPY), activated carbon, graphene or carbon nanotubes.

Embodiment 10

In a further embodiment of any one of embodiments 1 to 9, the electrolyte is electrolytic acid, KOH/acetonitrile, or a gel electrolyte.

Embodiment 11

In a further embodiment of any one of embodiments 1 to 10, the first trench opening in the first substrate is cylindrical in shape having a first diameter, the protruding structure in the second substrate is cylindrical in shape having a second diameter, and wherein the second diameter is smaller than the first diameter.

Embodiment 12

In a further embodiment of embodiment 11, the first diameter is 20% larger than the second diameter.

Embodiment 13

In a further embodiment of any one of embodiments 1 to 12, the first trench opening in the first substrate comprises a cylinder of about 1 μm in diameter and about 25 μm to about 75 μm in depth.

Embodiment 14

In a further embodiment of any one of embodiments 1 to 13, the process further comprises back grinding the first substrate and the second substrate and depositing a conductive metal material.

Embodiment 15

In a further embodiment of embodiment 14, the conductive metal material comprises a Ti—Ni—Ag tri-metal material.

Embodiment 16

In a further embodiment of any one of embodiments 1 to 15, the first substrate and the second substrate comprise set markings for alignment in the combining step.

Embodiment 17

In one embodiment, the invention provides an electrochemical double layer capacitor produced by a process according to any one of embodiments 1 to 16.

Embodiment 18

In one embodiment, the invention provides a process of making an electrochemical double layer capacitor comprising the steps of:
a) providing a conductive plate, wherein the conductive plate is attached to an insulating substrate board via a non-conductive adhesive layer and is fitted with contact pads on both edges;
b) forming a plurality of trenches by sawing the conductive plate at a predetermined pitch size to a depth where the adhesive layer is exposed, wherein the trenches having a floor composed of the non-conductive adhesive layer and side walls composed of the conductive plate;

c) coating the floor and the side walls of the trenches with a layer of electrode material to form electrodes;
d) sawing through the layer of electrode material on the floor of the trenches to form narrow trenches;
e) inserting separators into the narrow trenches, wherein the separators are attached to a frame comprising side walls;
f) sealing the sidewalls and the trench floor by flowing a framing adhesive around the separators; and
g) injecting electrolyte to fill gaps formed between the electrodes and the separators.

Embodiment 19

In a further embodiment of embodiment 18, the process further comprises:
h) placing the non-conductive adhesive layer on the insulating substrate board; and
i) attaching the conductive plate onto the non-conductive adhesive layer.

Embodiment 20

In a further embodiment of embodiment 19, the process further comprises:
j) injecting an adhesive to seal the topside;
k) exposing the contact pads;
l) attaching polar metal bars to the contact pads; and
m) assembling into casing.

Embodiment 21

In a further embodiment of any one of embodiments 18 or 20, the insulating substrate board is marked with alignment marks.

Embodiment 22

In a further embodiment of any one of embodiments 18 to 21, the non-conductive adhesive is a wax or a glue.

Embodiment 23

In a further embodiment of any one of embodiments 18 to 22, the conductive plate comprises highly doped silicon.

Embodiment 24

In a further embodiment of any one of embodiments 18 to 23, the layer of electrode material comprises a metal nano structure layer and a conductive metal oxide layer.

Embodiment 25

In a further embodiment of embodiment 24, the electrode material comprises activated carbon, graphene, carbon nanotubes, or PPY.

Embodiment 26

In a further embodiment of any one of embodiments 18 to 25, the electrolyte comprising sulfuric acid or KOH/acetonitrile.

Embodiment 27

In one embodiment, the invention provides an electrochemical double layer capacitor produced by a process according to any one of embodiments 18 to 26.

Embodiment 28

In one embodiment, the invention provides an electrochemical double layer capacitor assembly comprising one or more of the electrochemical double layer capacitors according to embodiment 27.

All references throughout, such as publications, patents, patent applications and published patent applications, are incorporated herein by reference in their entireties.

Although the foregoing invention has been described in some detail by way of illustration and example for purposes of clarity of understanding, it is apparent to those skilled in the art that certain minor changes and modifications will be practiced. Therefore, the description and examples should not be construed as limiting the scope of the invention.

The invention claimed is:

1. A process of making an electrochemical double layer capacitor comprising the steps of:
   a) producing a first trenched electrode by forming an electrode layer on a first substrate having a first trench opening therein;
   b) producing a second trenched electrode by forming an electrode layer on a second substrate having a second trench opening therein, wherein the second trench opening in the second substrate having a 3-dimensional shape complimentary to the first trench opening in the first substrate and a remaining protruding structure substantially the same in shape as the first trench opening in the first substrate;
   c) combining the first trenched electrode and the second trenched electrode such that the protruding structure in the second trenched electrode substantially fit into the trench opening in the first trenched electrode and leaving a gap between the first electrode and the second electrode; and
   d) filling the gap between the first trenched electrode and second trenched electrode with an electrolyte.

2. The process according to claim 1, further comprising forming the first trench opening in the first substrate and forming the second trench opening in the second substrate.

3. The process according to claim 2, wherein the steps of forming the first trench opening in the first substrate and forming the second trench opening in the second substrate comprises photolithography etching.

4. The process according to claim 1, wherein the first substrate and the second substrate are highly doped silicon substrate.

5. The process according to claim 1, wherein the process further comprising forming a metal barrier layer on the first substrate prior to forming the electrode layer on the first substrate and/or forming a metal barrier layer on the second substrate prior to forming the electrode layer on the second substrate, and wherein forming the electrode layer on the first substrate and/or forming the electrode layer on the second substrate comprises sputtering an electrode material on the metal barrier layer.

6. The process according to claim 5, wherein the electrode material is polypyrrole (PPY), activated carbon, graphene or carbon nanotubes.

7. The process according to claim 1, wherein the electrolyte is electrolytic acid, KOH/acetonitrile, or a gel electrolyte.

8. The process according to claim 1, wherein the first trench opening in the first substrate is cylindrical in shape having a first diameter, the protruding structure in the second substrate is cylindrical in shape having a second diameter, and wherein the second diameter is smaller than the first diameter.

9. The process according to claim 1, wherein the first trench opening in the first substrate comprises a cylinder of about 1 μm in diameter and about 25 μm to about 75 μm in depth.

10. The process according to claim 1, further comprising back grinding the first substrate and the second substrate and depositing a conductive metal material.

11. The process according to claim 10, wherein the conductive metal material comprises a Ti—Ni—Ag trimetal material.

12. A process of making an electrochemical double layer capacitor comprising the steps of:
   a) providing a conductive plate, wherein the conductive plate is attached to an insulating substrate board via a non-conductive adhesive layer and is fitted with contact pads on both edges;
   b) forming a plurality of trenches by sawing the conductive plate at a predetermined pitch size to a depth where the adhesive layer is exposed, wherein the trenches having a floor composed of the non-conductive adhesive layer and side walls composed of the conductive plate;
   c) coating the floor and the side walls of the trenches with a layer of electrode material to form electrodes;
   d) sawing through the layer of electrode material on the floor of the trenches to form narrow trenches;
   e) inserting separators into the narrow trenches, wherein the separators are attached to a frame comprising side walls;
   f) sealing the sidewalls and the trench floor by flowing a framing adhesive around the separators; and
   g) injecting electrolyte to fill gaps formed between the electrodes and the separators.

13. The process according claim 12, further comprising:
   h) placing the non-conductive adhesive layer on the insulating substrate board; and
   i) attaching the conductive plate onto the non-conductive adhesive layer.

14. The process according to claim 13, further comprising:
   j) injecting an adhesive to seal the topside;
   k) exposing the contact pads;
   l) attaching polar metal bars to the contact pads; and
   m) assembling into casing.

15. The process according to claim 12, wherein the non-conductive adhesive is a wax or a glue.

16. The process according to claim 12, wherein the conductive plate comprises highly doped silicon.

17. The process according to claim 12, wherein the layer of electrode material comprises a metal nano structure layer and a conductive metal oxide layer.

* * * * *